Feb. 2, 1937. N. E. McLAUGHLIN 2,069,321
TIRE DISPLAY RACK
Filed Dec. 13, 1933
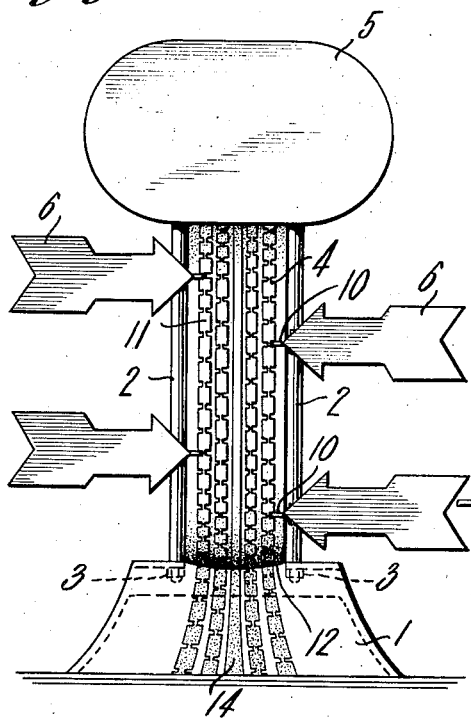
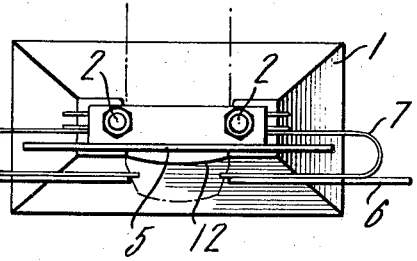
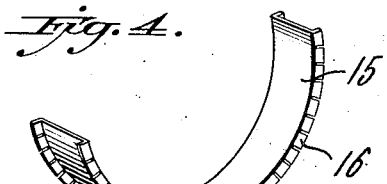
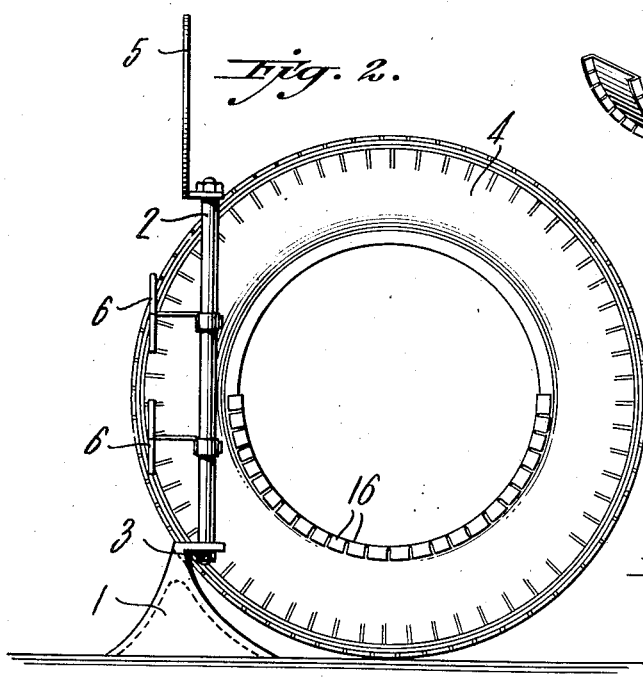
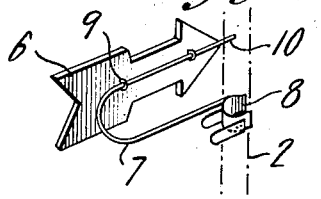
INVENTOR
NELSON E. McLAUGHLIN
ATTORNEY Patented Feb. 2, 1937

2,069,321

UNITED STATES PATENT OFFICE 2,069,321

TIRE DISPLAY RACK

Nelson E. McLaughlin, Larchmont, N. Y., assignor, by mesne assignments, to United States Rubber Company, New York, N. Y., a corporation of New Jersey Application December 13, 1933, Serial No. 702,179

3 Claims. (Cl. 40—125)

My invention relates to tire display racks, and more particularly to tire display racks capable of use out of doors.

In displaying automobile tires it is usually desirable to conspicuously display the name of the tire, the name of the dealer, and characteristic features of such tires. As tires are now displayed at automobile filling stations, the display racks must be capable of withstanding the elements. As the characteristic features of tires vary between different makes and between different sizes and/or styles of tires manufactured by the same tire manufacturer, the pointers calling attention to such characteristics need to be adjusted and/or varied from time to time.

By the present invention I provide an automobile tire display rack which may be used for indoor or out-of-door display. The display rack is provided with means for supporting a tire in a vertical position. The base may be curved and given certain indicia which merge with the tread configurations of a tire so as to simulate the impression of the tire rolling along a road surface. Various movable pointers are mounted on the rack and are capable of adjustment so as to point out different characteristics of different tires. As the display rack is used out of doors, I also provide means for closing the lower inner periphery of the tire against rain, snow, and the like.

The accompanying drawing illustrates a present preferred embodiment of the invention, in which Fig. 1 is a face view of a tire display rack embodying the present invention with an automobile tire mounted therein;

Fig. 2 is a side view thereof;

Fig. 3 is a plan view of the display rack;

Fig. 4 is a perspective view of a shield for closing the inner periphery of the tire;

Fig. 5 is a detail view showing the adjustable mounting of the pointers; and

Fig. 6 is a view partially in section of a modified form of mounting for the pointers.

Referring to the drawing, the tire display rack embodying my invention involves a base 1 which is preferably of stamped metal, although wood may be used. The exposed surfaces of the base are preferably curved. Uprights 2 are secured to the base 1 in any convenient manner, nuts 3 being illustrated. The uprights are spaced apart sufficiently far to accommodate an automobile tire 4. The uprights 2 are joined at their upper ends by a plate 5 on which suitable advertising notices may be placed. Such notches may take the form of the name of the tire, the manufacturer of the tire and/or the name of the dealer. One or more pointers, arrows, or indicators 6 is or are mounted on each of the uprights 2 for displaying advertising matter calling attention to various characteristics of the tire. The pointers are mounted on bent wires 7 which in turn are secured, as by welding, to clamps 8 which are adjustable and/or removable from the supports 2. The wires are secured to the pointers by any suitable means, such as the staples 9, in the case of wooden pointers, or by equivalent means in the case of metal pointers. Each supporting wire 7 may have a portion 10 which extends beyond the end of the associated pointer 6 so as to engage and be secured to the appropriate part of a tire. A convenient way of mounting the pointers 6 is to have the wire portions 10 interfit between the anti-skid projections 11 on the tire.

The front curved face of the base 1 may be slightly curved at its upper edge 12 in order to snugly fit the contour of the tire. The exposed surface of the base may be used to display advertising matter or may be given markings 14 similar to the tread configurations 11 of the tire so that the markings 14 in conjunction with the tread configurations 11 of the tire 4 simulate the appearance of the tire rolling along a roadway.

In order to protect the inner surface of the tire 4 from rain, snow, and the like, I provide a temporary metallic shield 15 having resilient edges 16, illustrated in Fig. 4, which may be slipped over the beads of the tire, preferably along its lower inner periphery, the upper inner periphery being protected by the force of gravity and the shielding effect of the outer surface of the tire.

Referring to Fig. 6, I have illustrated another method of mounting the pointers 6. The support 2 is provided with a perforation 17 through which a bolt 18 extends for cooperation with a clamping nut 19. A flange 20 is provided on the bolt 18 for opposing the nut 19.

The various parts of the display rack may be suitably decorated and finished so as to withstand the deteriorating effects of exposure to all kinds of weather. While I have shown the display rack made of metal, it is to be understood that certain of the features of the present invention may be embodied in structures made wholly or in part of wood.

While I have shown and described a present preferred embodiment of the invention, it is to be understood that it may be otherwise embodied within the spirit of the invention and the scope of the appended claims.

Having thus described my invention, what I claim and desire to protect by Letters Patent is:

1. A display rack comprising a base, spaced uprights extending therefrom and spaced to receive an automobile tire, and indicators adjustably and resiliently mounted on said uprights and extending inwardly of said uprights to engage an automobile tire placed between said uprights.

2. A display rack for automobile tires comprising a base having a curved face, a pair of uprights extending upwardly from the base to receive a tire therebetween, a member having a display surface connecting the upper ends of said uprights, indicia for cooperating with a tire mounted in the rack, flexible wires resiliently supporting the indicia, and means for adjustably attaching the wires to the uprights, the free ends of the wires extending beyond the indicia to engage various parts of said tire and direct the indicia thereto, and tread insignia on the curved face of said base merging with the tire tread.

3. A display rack for automobile tires comprising a base, a pair of uprights extending upwardly from the base to receive a tire therebetween, a connecting member for the upper ends of the uprights, indicia for cooperating with a tire mounted in the rack, flexible wires resiliently supporting the indicia, and means for adjustably attaching the wires to the uprights, the free ends of the wires extending beyond the indicia to engage various parts of said tire and direct the indicia thereto.

NELSON E. McLAUGHLIN.